March 3, 1970  A. M. RICHARDS  3,498,127
MEASURING FLUID FLOW

Filed June 9, 1966  5 Sheets-Sheet 1

INVENTOR
ALBERT M. RICHARDS
BY
ATTORNEYS

March 3, 1970  A. M. RICHARDS  3,498,127
MEASURING FLUID FLOW

Filed June 9, 1966  5 Sheets-Sheet 2

INVENTOR
ALBERT M. RICHARDS
BY *Stryker & Jacobson*
ATTORNEYS

INVENTOR
ALBERT M. RICHARDS
BY Stryker & Jackson
ATTORNEYS

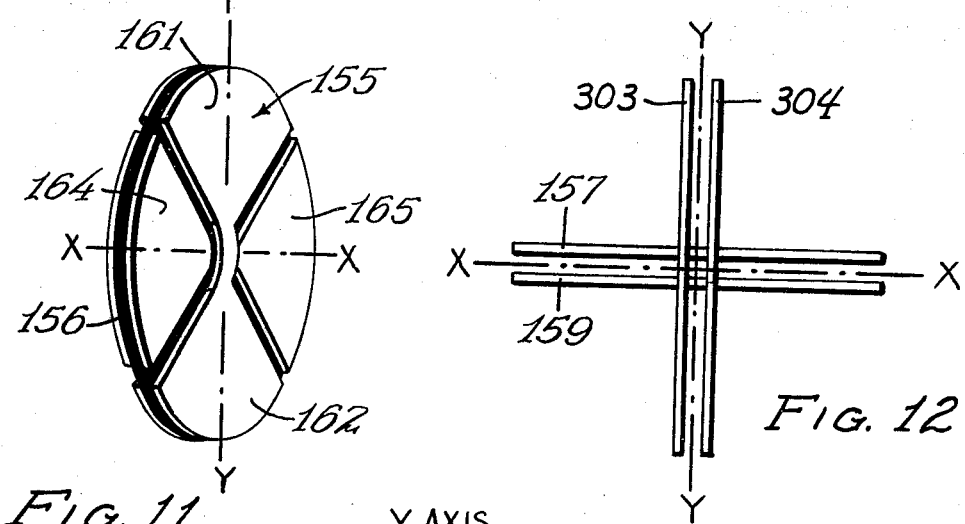
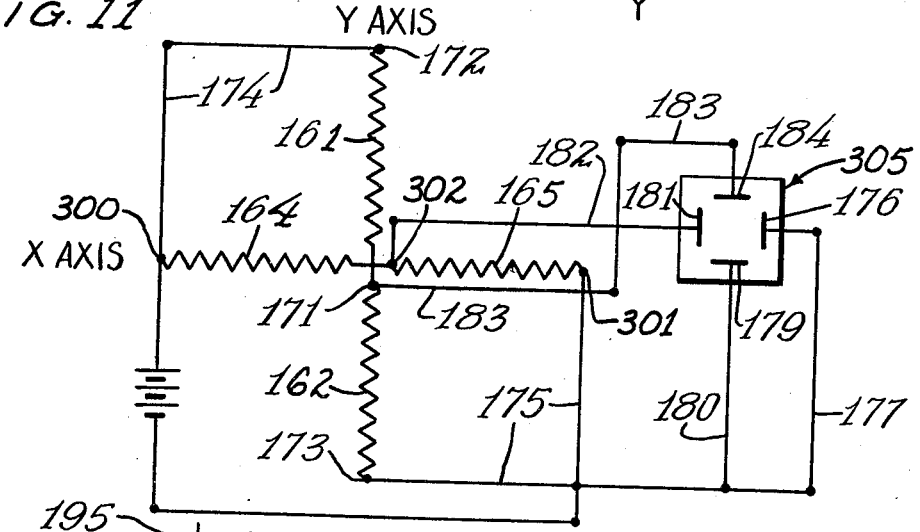
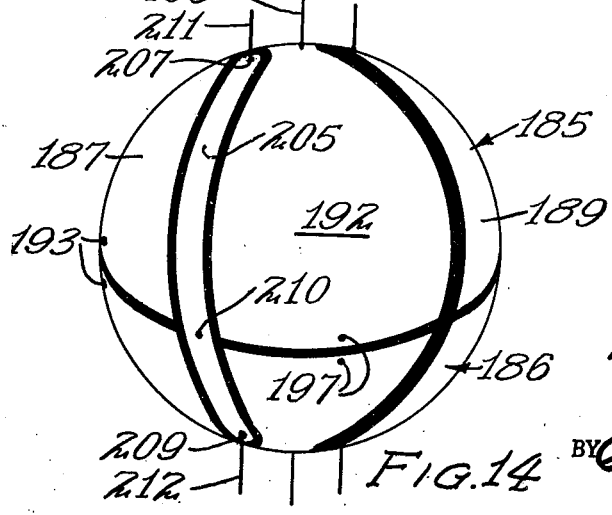
INVENTOR
ALBERT M. RICHARDS
BY Stryker & Jackson
ATTORNEYS INVENTOR
ALBERT M. RICHARDS
BY Stryker & Jacobsen
ATTORNEYS États-Unis Patent Office 3,498,127
Patented Mar. 3, 1970

3,498,127
MEASURING FLUID FLOW
Albert M. Richards, 5 Crocus Place,
St. Paul, Minn. 55102
Filed June 9, 1966, Ser. No. 556,427
Int. Cl. G01f 1/00
U.S. Cl. 73—204                                6 Claims

ABSTRACT OF THE DISCLOSURE

A number of elements, which are capable of producing an energy field when energized, are coupled to a source of power and all are placed in contact with the fluid to produce an energy field having its center within the fluid. The elements are arranged in a circuit configuration so that the direction and degree of fluid flow can be ascertained by measuring the change in certain characteristics of the elements brought about by the flow of fluid. In a general case, a number of sets of elements are arranged to indicate fluid flow about the X, Y and Z axis.

---

This invention relates generally to the measurement of fluid flow and more particularly is directed toward measuring fluid flow by the manner in which it affects an energy field. This invention further provides measurement and display of the velocity and direction of fluid flow.

Although it is contemplated that various types of energy fields can be used, the invention will generally be described herein as using a thermal energy field, no limitation thereto being intended. Heretofore, there have been two principal types of flow meters. One, originated by Professor Carl Thomas and described in the Journal of Franklin Institute, 1911, involves injecting a certain amount of heat into the fluid and determining the heat transferred from the heater to a downstream sensor by comparing the temperature of this sensor to ambient temperature. The second, developed by Professor L. V. King and described in the Philosophic Transactions of the Royal Society of London, measures the power required to maintain a constant temperature at an electrical conductor in a flowing stream of fluid.

There are various disadvantages with these earlier thermal flowmeters. Complex interpretation of the signals is necessary and expensive measuring devices are required.

Both of these earlier devices are ambiguous at zero flow. In the Thomas device the calibration curve is discontinuous at no flow condition and King's device has ambiguity for no-flow conditions because of a variance in the heat dissipated by natural convection.

In the King system, elaborate feedback circuits are required to maintain a constant temperature of the heat source.

In both devices, all temperatures are referenced to ambient temperature and slight random changes in this reference produce large errors.

The King device is not direction sensitive and the Thomas device indicates direction only in a line from the heat source to the downstream sensor, and is incapable of sensing the magnitude of instantaneous velocity flow at a point.

Among other types of flow meters used heretofore is an ultrasonic flow meter which operates on the Doppler effect of change in apparent frequency. This requires elaborate circuitry to detect minute frequency shifts and to avoid zero drift. Furthermore, it uses a completely different method for determining flow.

An electromagnetic flowmeter which measures flow by the electrical potential generated by the movement of an electrically conductive fluid through the magnetic field has also been used in the past. This device has been hampered by zero shift, and difficulties with component parts.

Other sources of errors in various flowmeters are attributable to varations in the thickness of the fluid film adherent to the sensors and random variations in the properties of the fluid media such as its specific heat, density, viscosity, and the like. Thus, despite increasingly elaborate, complex and expensive modifications, because of limitations inherent in the principles upon which these earlier flow rate detectors operate, they are unable to measure the rate and direction of displacement of fluid with respect to a single point in space.

It is a general object of this invention to overcome these disadvantages encountered with earlier flowmeters.

If a point in space, called the origin, has a different energy level than that in the surrounding media, a field of energy exists having an energy gradient between the origin and its environment. If the origin is the source of the energy, the distribution of the energy field produced can be plotted in terms of isopotential loci. These loci as well as other points may be projected on N axes, and these projections may in turn be expressed as spherical coordinates with reference to the origin. For example, the position of the centroid, which is defined as the center of the energy field, may be expressed in terms of distance from the origin and its angular relation to the origin. In the case of a thermal energy field, if the surrounding environment is homogeneous and at rest and disregarding convection, the distribution of the energy field principally as a result of conduction, and to a lesser extent as a result of radiation, generally follows the second law of thermodynamics and is spherical. In other words, the thermomotive force tends to distribute the thermal energy in a uniform fashion about the origin so that the eccentricity of the field is substantially zero and the centroid location coincides with the origin. The source of the energy field may be a point or at least appear as a point source. If, however, the media in which the energy is distributed is moved about, the energy field is deformed and becomes eccentric so that this uniformity between location of the centroid and the origin is disturbed. This occurs in a predictable fashion and is a function of the relative movement of the media. It is this deformation that is used in the present invention to indicate the direction and rate of fluid flow. Therefore, it is a more specific object of this invention to measure fluid flow by the manner in which it deforms an energy field.

Still a further object of this invention is to use the eccentricity of an energy field caused by fluid flow as an indication of the relative rate and direction of the flow.

As stated earlier, if the fluid particles of the surrounding media are moved with respect to the origin, the energy field will be deformed and become eccentric. The direction and magnitude of eccentricity of the field can be measured by the direction and distance of displacement of the centroid of the energy field from the origin and this is directly proportional to the direction and rate of displacement of the media with respect to the origin. In this connection it has been found that if the energy from a source is constant, the volumes of the loci of the field are inversely proportional to the rate of displacement of the media. Because of this variation in the size or intensity of the energy field, for the displacement of the centroid to be meaningful it is measured in terms of the field size existing at the same instant in time. Thus, the eccentricity of the field may be expressed as the ratio of the displacement of centroid to the size of the field in the plane of displacement. The eccentricity, therefore, may be estimated as the ratio of the centroid displacement to one-half the length of the axis of the field in the plane of displacement. The angular relation of the direction of eccentricity with respect to the origin is determined by the projection of the centroid displacement on appropriate axes.

It is, therefore, a further object of this invention to measure the eccentricity of an energy field brought about by relative flow of fluid in that field by considering the change in the field centroid to thereby indicate the rate and direction of the fluid flow.

Heretofore we have been concerned principally with multidirectional movement of the centroid relative to the origin, that is, along X, Y and Z axes in space. The invention is equally applicable to the case of displacement of fluid media through an energy field surrounding a point of a fluid-solid interface on a surface of positive or negative curvature. If the surface is flat, the Z axis may be considered to be at zero and the loci are projected on the remaining X and Y axes of references. If the surface of the fluid-solid interface has a negative curvature, as on the inner surface of a hollow cylinder, and the centroid displaced only along one axis, both the Y and Z axes may be set to zero and the position of the centroid measured along the X axis.

Briefly, according to a preferred embodiment of this invention, an energy field which is symmetrical about an origin is created in a fluid so that under conditions of no fluid flow the centroid and the apparent origin are at the same location. Fluid flow in any direction acts to deform the field and displace the centroid of the field relative to the origin. This displacement of the centroid is measured to give an indication of the field eccentricity and, correspondingly, an indication of the fluid flow. Where this displacement may be in any direction, this measurement may be determined along the X, Y and Z axes. The projections along these axes may then be effectively operated on by a simple analog device to provide a displayed representation of field eccentricity. Where displacement is along a single plane, the measurement may be determined along any two of these axes. Where displacement is linear, it may be measured along a single axis.

Since the thermal conductivity of many fluids may be less than desirable, a further feature of this invention resides in augmenting the effect of the centrifugal thermomotive force which is primarily a function of conduction by using an energy conductive material to facilitate establishing the field. Such a field may be, for example, concentric with the origin, or it may be along the axes of reference. This conductive material must have low mass or energy capacity to provide a small time constant for high frequency response.

One form of a structural embodiment of the invention includes a sensing unit having a pair of elements extending along an axis on opposite sides of a point designated as the origin. Certain properties of these elements vary as a function of the energy present, e.g., electrical resistance. Heat may be introduced at the origin to provide a thermal energy field, or the heat produced by current flow through the elements may provide the energy field when resistance elements are used. A source of current is connected across opposite ends of the two resistance elements, with the direction of current flow through one element being reversed from that through the other. Each resistance element is provided with a center tap, preferably adjustable, and the two center taps are connected to an oscilloscope or other appropriate indicating meter.

In the event additional heating or a more intense thermal field is desired, a supplemental current supply source may be connected to the center portion of each resistance element by connectors on both sides of the center tap. Such an arrangement provides a relatively high temperature at the center area of each resistance element without requiring additional elements. The points of connection between the supplemental current sources and the resistance element are preferably adjustable so as to provide a proper thermal field relative to the origin.

It is further contemplated that a feedback circuit may be included to control the supplemental current by the output of the sensing circuit so that a proper field is maintained at all times. This may be particularly appropriate, for example, when used with a fluid whose physical properties may be greatly changed by local heating. Also, a separate heating coil may be added if desired to further increase the intensity of the field.

The element may be formed in various shapes. However, preferably the resistance elements are made as thin films of material on the surface of a flat strip, on the inside or outside of a tube, on the outside of a sphere or on any similar convenient support thereby providing low thermal resistance with large surface area exposed to fluid, but high electrical resistivity along the axes. The resistance elements do not obstruct the flow. As a result, the structure can be used where minimum pressure loss is a requirement. Only the resistance elements themselves are exposed to the flow of fluid and they may be covered with a protective film if necessary.

The invention provides for high frequency response to changes in flow. Furthermore, because the element appears as a very low impedance load, e.g., in the order of 50 ohms, a high signal to noise ratio is provided. Also, in a device constructed according to the teachings of this invention, there are no moving parts and the device measures flow directly, being operated either in digital or analog fashion. The invention is not limited to use with conductive fluids and can be used to measure flow of all fluids.

Within broad limits, a device constructed according to the teachings of this invention is but little affected by change in ambient temperature, and has a signal output which is a linear function of flow rate and direction.

These and other objects and features will be more clearly and fully set forth in the following specification and claims with reference to the accompanying drawings, in which:

FIGURES 1A and 1B illustrate the distribution of an energy field produced in a fluid under the conditions of no flow of the fluid;

FIG. 2 functionally illustrates a typical manner of using the invention to measure fluid flow;

Figure 9:
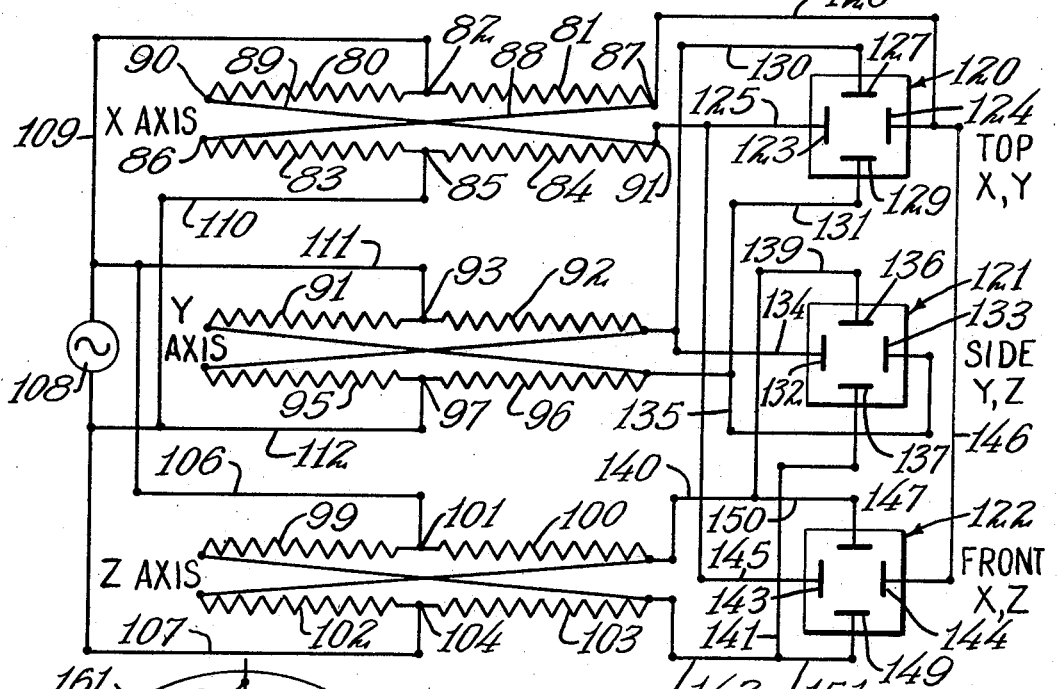
Figure 10:
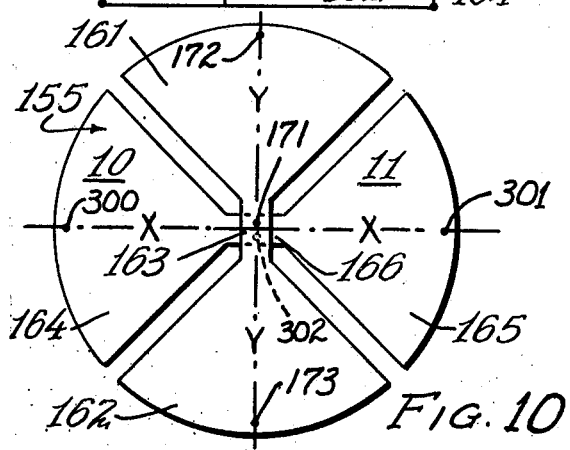
Figure 15:
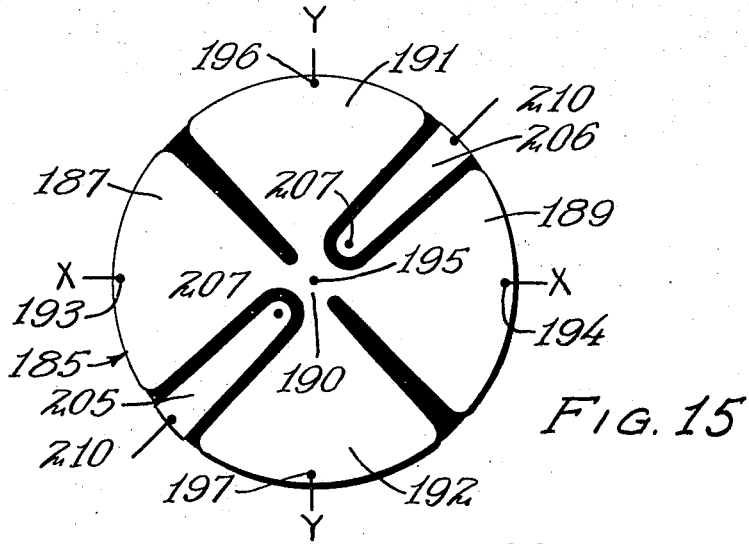
Figure 16:
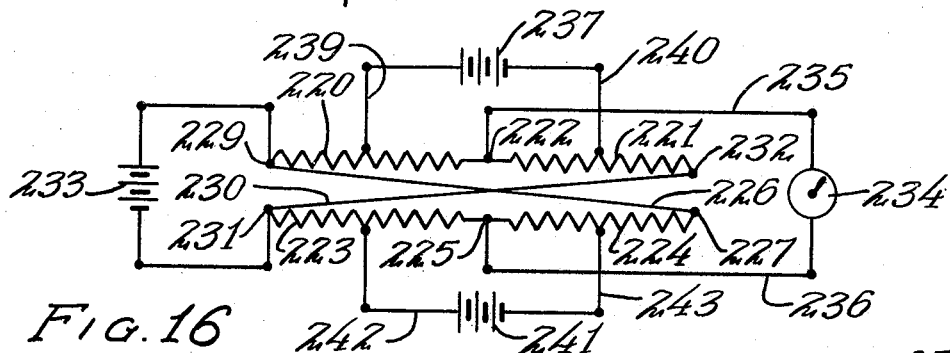
Figure 17:
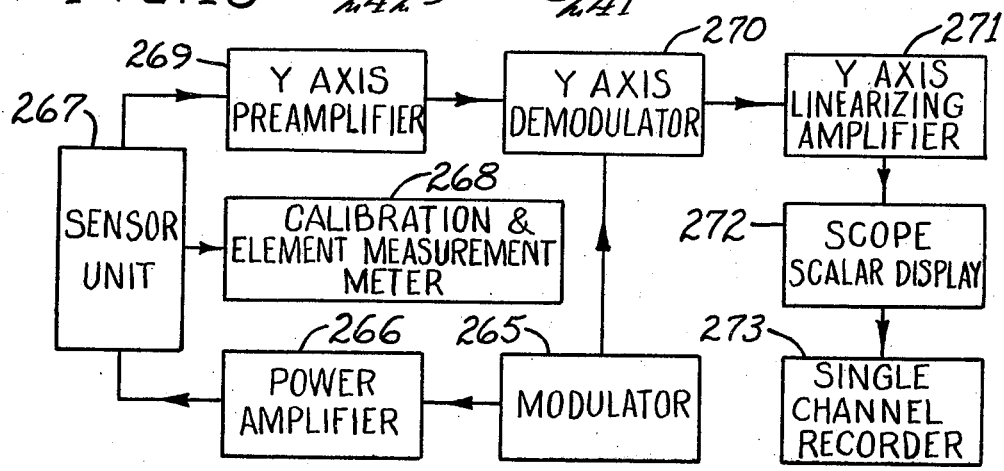

FIG. 9 schematically illustrates circuitry for measuring and displaying change in the energy field along three axes;

FIG. 10 illustrates another sensor constructed substantially in disk-like form;

FIG. 11 illustrates construction of a sensor in a sandwich arrangement of two disks such as illustrated in FIG. 10;

FIG. 12 illustrates diagrammatically the arrangement of two pairs of sensor elements intersecting at right angles;

FIG. 13 is an electrical schematic of a circuit for measuring and displaying the degree of fluid flow using two intersecting sensor resistance elements;

FIG. 14 illustrates another sensor element constructed in spherical form;

FIG. 15 is a plan view of the spherical element of FIG. 14;

FIG. 16 is a schematic illustration of the manner in which an additional source may be connected to provide a greater energy field;

FIG. 17 illustrates in block diagram form the functional operation of a somewhat elaborate system for measuring, displaying and recording change in the energy field about one axis.

Figure 1:
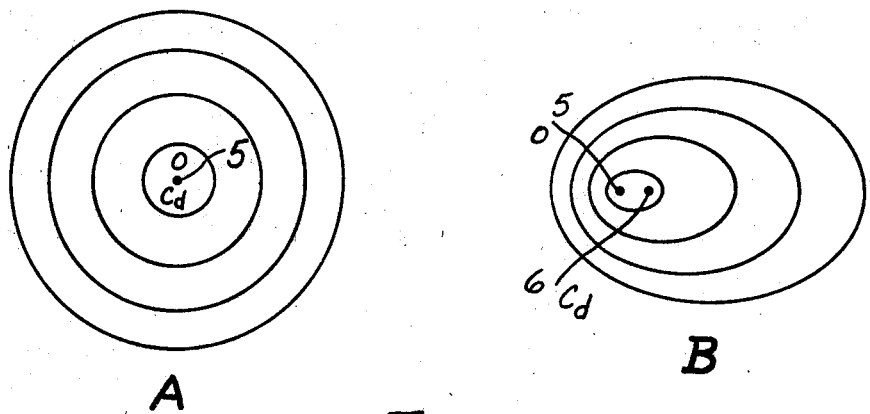

Referring now to FIG. 1A, theoretically the distribution of energy produced in a fluid by a source located at the origin is uniform with respect to the origin when the fluid is stationary. The centroid, Cd, of the energy field in this case is concentric with and located at the origin. FIG. 1B illustrates the manner in which flowing fluid may deform the field distirbution so that the size or intensity of the energy field is altered and the centroid is displaced from the origin to its new location at 6. The degree of eccentricity and/or the direction and distance of displacement of the centroid give a measurement of the magnitude and direction of fluid flow. It should be kept in mind that FIG. 1 is intended to illustrate the field distribution about only a single axis which in this instance can be considered to be on end at the origin, O. Ordinarily, of course, the energy field distribution is in all directions. If the energy considered is heat, the distribution of the thermal field neglecting natural convection, in the case of no fluid flow would be spherical. The degree of change of the energy field caused by fluid flow would then be measurable about three different axes.

As a structural example, consider a pair of parallel elongated resistance elements arranged parallel to the direction of flow of a fluid. One end of one resistance element is connected to the opposite end of the other element, and the other end of the first resistance element is connected to the opposite end of the second element. A supply of electrical current is connected between center taps of the two resistance elements or, alternatively, the supply may be connected between the unconnected ends of the elements. A meter is connected between the unconnected ends of the elements or, in the alternative case, the meter is connected between the center taps. The meter is set to provide a zero or other predetermined reading under no flow conditions. The heat generated by the current flow through the resistance elements creates an energy field which is generally uniform about the center thereof. When the fluid starts to flow, the centroid of the field is displaced downstream. The center of electrical balance of the interconnected resistances moves away from the center taps and this change is indicated on the meter, thus measuring and indicating the field eccentricity caused by the fluid flow.

The signal representation, S, which results from bridge unbalance may be expressed mathematically using a standard bridge equation as follows:

(a) $$S = \frac{(R+X)^2}{R^2} - \frac{(R-X)^2}{R^2} = \frac{4X}{R}$$

where R is the "normal" resistance from the center to the peripheral tap and X is the change in resistance as a result of change in energy distribution induced by displacement of media. Correspondingly, it can be shown in the general case that a measure of change in an energy field, which can be designated S1, is derived from the equation:

(b) $S1 \approx KE$ where K is a proportionality constant and E is the field eccentricity brought about by the change in the field. It can then be shown that (a) and (b) can be combined so that the electrical signal developed from unbalance of the bridge circuit provides a direct reading of change in the energy field.

By providing two elements, such as described above, arranged at right angles to one another, the direction and distance of movement of the centroid of the energy field in any direction in a plane may be measured. The location of the centroid projected along an X and Y axis can be readily found in this manner. The actual physical construction of the elements may vary considerably in form. The same basic system can function very effectively in a three dimensional system. The resistance elements are arranged along mutually perpendicular X, Y and Z axes and the change in location of the centroid brought about by fluid flow can be projected along these axes. A convenient form for sensor for this purpose may be a spherical body having on its surface resistance elements arranged along X, Y and Z axes. The sphere may be said to simulate the earth, having north and south poles, and northern and southern hemispheres. This will be described later in greater detail.

Figure 3:
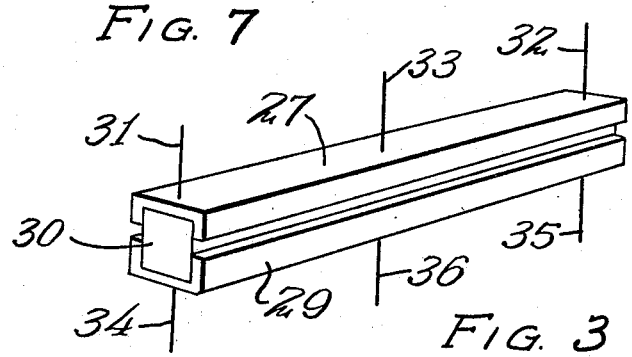
FIG. 3 illustrates an embodiment of a sensor constructed as an elongated rectangular element split down its sides.

The structural form of the sensor may be in various forms or shapes. FIGURE 3 shows an elongated rectangular structure which is split to form a pair of channels 27, 29. The two channels 27 and 29 are supported by a block of insulating material 30. The channel 27 has electrically connected end taps 31 and 32 and the channel 29 is provided with end taps 34 and 35. Both channels 27 and 29 have electrical center taps, 33 and 36, respectively.

Figure 4:
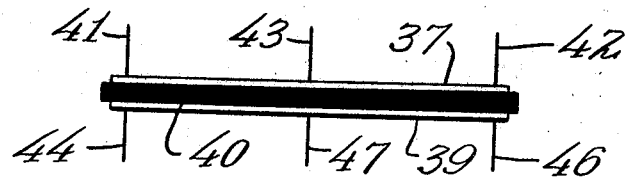
FIG. 4 is a cross-sectional view of another construction of the sensor element.

FIGURE 4 illustrates a pair of parallel resistance elements 37 and 39 which are held in spaced relation by a nonconductor 40. End taps 41 and 42 and center tap 43 are provided for element 37 and element 39 is provided with end taps 44 and 46 and center tap 47.

Figure 5:
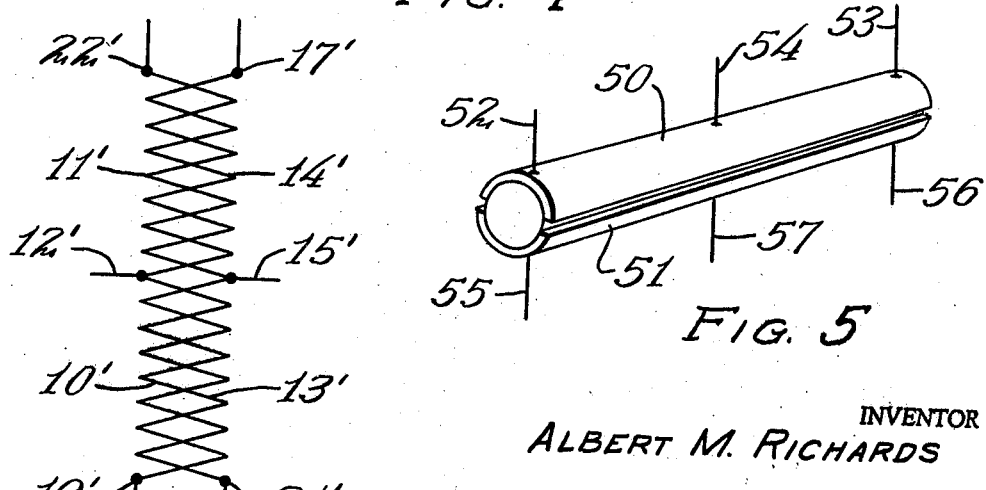
FIG. 5 illustrates the sensor element constructed as a split cylinder.

A third variation is shown in FIG. 5 in a split cylinder form. The semi-cylindrical resistance element 50 is provided with end taps 52 and 53 and a center tap 54 and the resistance element 51 includes end terminals 55 and 56 with center tap 57. In all of these, the resistance elements are electrically conductive and are thermal responsive so that their resistance values change with temperature. Furthermore, the sensors shown in FIGS. 3, 4 and 5 can be constructed so that the fluid flows between the elements and can be further used in a manner such that the entire fluid flow is between the elements. For example, the elements such as 27 and 29 or 50 and 51 could comprise opposite facing walls or portions of a conduit in which the fluid is flowing. In that case a suitable insulating material would be needed to close off the gap between the elements to constrain the fluid. Each element would then have a single surface interface with the fluid. It is clear that in this configuration, fluid flow would be measurable only along a single axis. This construction would be useful in pipelines and the like where it is desired to measure volume flow. The fluid velocity measured in this manner can be combined with the known or predetermined cross sectional area to provide a measurement of volume flow per unit time. It is clear that volume flow can also be measured by immersing the sensor in the fluid body as long as the velocity profile and the location of the sensor are known or are determinable.

Figure 6:
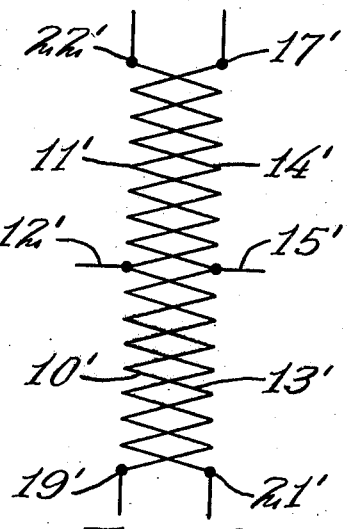
FIG. 6 illustrates the sensor constructed in a wound wire fashion.

FIGURE 6 shows another form the sensor may take. It is in the form of two resistance wires 10', 11', and 13', 14' which correspond to the electrical resistance representations 10, 11 and 13, 14 in FIG. 7 and would ordinarily be similarly connected as in FIG. 7 to measure displacement of the centroid of the energy field caused by flow of fluid longitudinally past the resistances. These resistances may also be in the form of helical coils insulated from one another.

Figure 7:
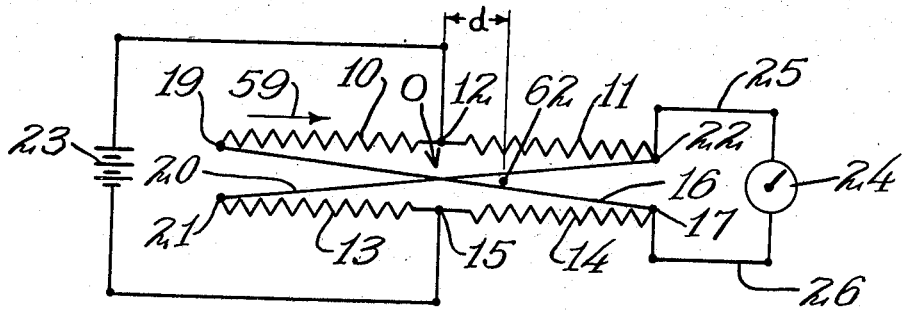
FIG. 7 illustrates in schematic form the electrical equivalent of an embodiment of the invention.

FIG. 7 is an electrical circuit representation of one form of the invention using an element such as illustrated in FIGS. 3, 4, 5 or 6. The circuit is in a Wheatstone bridge configuration connected in a manner to detect translation of the fluid media. Resistances 10 and 11 connected together at 12 correspond to the center tapped sensor portions 27, 37 or 50 of FIGS. 3, 4 and 5 respectively, and resistances 13 and 14 connected together at 15 have similar corresponding counterparts in those same figures. Each end 19 and 22 of sensor element 10, 11 is electrically connected to the opposite end, 17 and 21, respectively, of the other element 13, 14. Electrical power source 23 is connected across the center tap at 12 and 15 and an indicating meter 24 is connected across terminals 22 and 17. The resistance elements are identical to one another so that they have the same thermal coefficient of resistivity and with the fluid at rest are all equal in resistance values.

Figure 2:
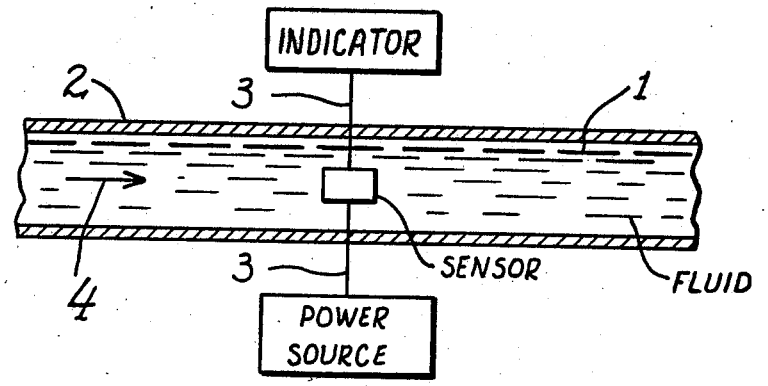

In its simplest case the invention may be used in the manner such as illustrated in FIG. 2. The sensor element such as shown in FIG. 3, comprising the two halves 27 and 29, is inserted into the fluid 1 carried by a conduit 2. Appropriate leads 3 are provided for the electrical power source 23 and the indicating meter 24 which are located outside the conduit. With the power source 23 turned on, current will flow equally through all of the portions of the resistance elements to produce a rise in temperature thereby providing a thermal energy field in the fluid. Although the sensor elements are illustrated as being elongated in nature, in actual practice they may be quite small often having dimensions in the order of a few centimeters or less. Regardless of the geometry, however, it is helpful to consider the thermal energy as if it were emanating from a point source. Since the same amount of current flows through all of the resistive elements, if the fluid is assumed to be at rest, the energy field is uniform about the source in a manner such as illustrated in FIG. 1a. Typically the amount of current flowing through the resistive elements is in the order of 40 milliamperes which is produced by using a source of 4 volts and resistance values in the order of 100 ohms. If the fluid in the conduit 2 is then made to flow, for example, in the direction of arrow 4 (or 59 in FIG. 7) the distribution of the thermal energy is no longer uniform about the origin so that the field changes in shape to an eccentric form such as illustrated in FIG. 1b. With this change in length, width and breadth of the thermal field the effect of the rise in temperature is no longer equal on all of the resistance elements. The thermal coefficient of restivity is such that the elements change in resistance values thereby unbalancing the Wheatstone bridge circuit, which unbalance is detected by the indicating meter 24. The meter reading indicates the degree of change of position of the centroid from the origin 5, which is also labeled O as represented in the electrical circuit diagram in FIG. 7, to its new location 6 in FIG. 1b or as denoted by reference numeral 62 in FIG. 7. In other words, by electrical integration of the energy density along the element the distance $d$ (FIG. 7) by which the centroid shifts with respect to the length of the element due to the fluid flow is direcly related to the magnitude of the reading which appears on the meter 24 thus displaying the eccentricity of the field. Because of the electrical circuit arrangement the direction of the fluid flow is reflected by the direction that the poiner in the indicating meter 24 moves. In this manner then it can be seen that the sensor element serves the dual function as the source for the thermal energy field and the detector of the change in the field brought about by the flow of the fluid. At the same time it can be observed that a single meter hooked into the circuit can be used to show not only the velocity of fluid fllow but likewise the direction. It should be recognized, however, that even though the embodiment of the invention described heretofore will provide an accurate indication of direction and velocity of fluid flow where the flow is confined along a straight line path in a conduit, in a more general case a more accurate representation is necessary. Where the direction of fluid flow is random, the configuration of this embodiment of the invention will measure and display the direction and magnitude of the flow only as it is projected on a line running parallel to the length of the element. Where two and three dimensional indications are desired, it becomes necessary to provide additional sensing elements *angularly* arranged with respect to one another and electrically combined to provide the desired readings of the vector quantity.

Figure 8:
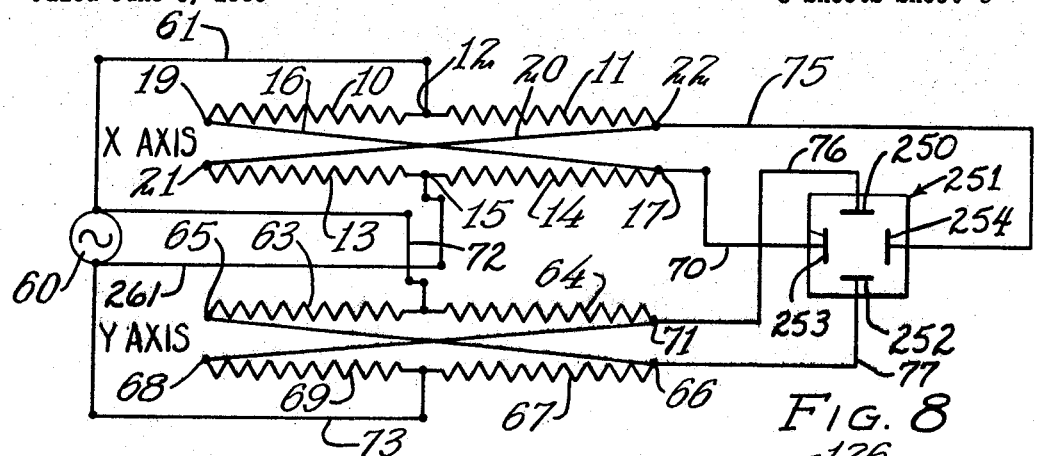
FIG. 8 illustrates an electrical circuit schematic for measuring and displaying change in the energy field on two axes.

In order to measure and display fluid flow in two directions, that is along "X" and "Y" axes, two sets of elements which are at right angles to one another are connected together. The electrical circuit for such an arrangement is shown in FIG. 8 and is merely a doubling up of the single element circuit shown in FIG. 7. Accordingly, the reference numerals used to identify the element labeled as on the "X" axis are the same as those in FIG. 7. In this circuit the power source 60 illustrated as an AC generator is connected on one side by conductor 61 to the center tap 12 and at its other side by the conductor 261 to the center tap 15. A similar circuit arrangement is provided for the element along the "Y" axis. A center-tapped resistance element 63, 64 is connected at one end 65 to the opposite end 66 of another center-tapped resistance element 67, 69. The end 68 of the resistance 69 is connected to the end 71 of the resistance 64. In other words, the arrangement is identical to that shown for the "X" axis element but is physically located at a right angle thereto. Current is supplied to the center of the resistance 63, 64 by a conductor 72, and to the center of the resistance unit 67, 69 by the conductor 73.

The "X" axis element has terminal 22 of the resistance 11 connected by a conductor 75 to a horizontal deflection plate 254 of an oscilloscope 251 and the other horizontal deflection plate 253 is connected by a conductor 70 to terminal 17 of the resistance element 14. These plates are also connected to the terminal 19 of the resistance units 10, 11 by the conductor 16, and to the terminal 21 of the resistance unit 13, 14 by the conductor 20. Terminal 71 is connected by conductor 76 to vertical deflection plate 250 of the oscilloscope 251 and the other vertical deflection plate 252 is connected by conductor 77 to terminal 66. Terminals 66 and 71 are connected by appropriate conductors to the opposite ends of the other part of the resistance elements.

The purpose and function of the circuit arrangement of FIG. 8 is to measure and display the change in position of the centroid not only as it may be projected on the "X" axis as represented between the ends 19, 22 and 21, 17, as fluid flows past these resistance elements, but also as it may be projected on the "Y" axis as represented by resistance elements 63, 64, 69 and 67. Thus, the oscilloscope 251 is capable of displaying as a vector quantity both the direction and velocity of fluid flow as projected in a plane.

For the most general case of random fluid flow, the circuit illustrated in FIG. 9 provides means for measuring and displaying the flow as projected along three axes which are mutually perpendicular. The "X" axis is provided with a resistance element 80, 81 which is center tapped at 82. Resistance element 83, 84 is center tapped at 85. An end 86 of resistance 83 is connected to an end 87 of the resistance 81 by a conductor 88. Similarly, a cross-connection 89 is provided connecting the end 90 of the resistance 80 with the end 91 of the resistance 84. The sensor for measuring along the "Y" axis is similarly arranged. A resistance element 91, 92 is center tapped at 93 and resistance element 95, 96 is center tapped at 97. Opposite ends of resistances 91 and 96, and resistances 92 and 95 are connected together as shown. For measuring along the "Z" axis, the sensor which is arranged perpendicular to the plane of the "X" and "Y" axes, comprises a resistance element 99, 100 which is center tapped at 101, and a resistance element 102, 103 which is center tapped at 104. One end of the resistance 102 is connected to the end of the resistance 100, and similarly, one end of the resistance 103 is connected to the end of the conductor 99. The center taps 101 and 104 are connected by conductors 106 and 107 across power generator 108. This generator 108 is also connected by the conductors 109 and 110 to the center taps 82 and 85, and by the conductors 111 and 112 to the center taps 93 and 97.

Three oscilloscopes 120, 121 and 122, each having two sets of deflection plates, are provided. Oscilloscope 120 displays the measurement of flow as projected in a plane containing the "X" and "Y" axes. The horizontal deflection plates 123 and 124 of the oscilloscope 120 are connected by conductors 125 and 126, respectively, to the terminals 91 and 87 at the outer end of the resistances 84 and 81. The vertical deflection plates 127 and 129 of the oscilloscope 120 are connected by conductors 130 and 131 respectively to the ends of the resistances 92 and 96. Oscilloscope 121 displays the measurement of flow as projected in a plane containing the "Y" and "Z" axes. The horizontal deflection plates 132 and 133 are connected to the terminals of the "Y" axis resistance portions 92 and 96 by conductors 134 and 135, respectively. The vertical deflection plates of the oscilloscope 121, indicated at 136 and 137, are respectively connected by conductors 139, 140 to the extremity of the resistance 100 and by the conductors 141, 142 to the extremity of the resistance 103. The oscilloscope 122 displays the measurement of flow as projected in a plane containing the "X" and "Z" axes. The horizontal deflection plates 143 and 144 are connected by conductors 145 and 146, respectively, to the conductors 125 and 126 leading to the terminals 91 and 87 of the "X" axis resistance elements. The vertical deflection plates 147, 149 are connected by conductors 150 and 151, respectively, to the conductors 140 and 142 leading to the ends of the resistance portions 100 and 103 which are a part of the "Z" axis resistance elements.

It bears repeating that the three dimensional system which is diagrammatically illustrated in FIG. 9 is the most versatile system since it can detect the change in the field centroid in any direction. All three systems which have been described differ from prior systems in that they provide a means for producing a field of energy such as heat, which has an apparent central point of origin. When fluid flows past a sensor or detector apparatus, the apparatus measures the eccentricity of the field or the displacement of centroid of the energy field which results from relative movement of the fluid. This energy field may be created by electrical current flowing through the various resistances which also serve as the sensors or detectors.

Referring now to FIG. 10, there is illustrated a disk-like sensor 155 which may be particularly suitable for use as the resistance elements in the circuit of FIG. 13. A pair of sector-shaped conductive films 161 and 162 are connected together by a narrow connecting member 163. These sectors can be considered as the "Y" axis resistance elements and the points 172, 173 and 171 represent the ends and the center tap thereof. Another pair of sector-shaped conductive elements 164 and 165 are connected by a narrow connecting member 166. These latter sectors, 164 and 165, can be considered as the "X" axis resistance elements of FIG. 13. The pair of sectors and the respective connecting members are electrically insulated from one another. The end points of sectors 164 and 165 are identified as 300 and 301 and the center tap is at 302. This form of the device may be useful where it is desirable to measure flow in any direction over a plane area. For example, a flat sensor such as disk type 155 may be attached to the hull of a ship or to an airfoil surface to measure flow patterns. As will become more apparent, the sensors as shown in FIGS. 10 and 11 can be used interchangeably. Selection of one or the other is a matter of choice and depends, for the most part, on application, desired frequency response and ambient temperature variations.

As illustrated in FIG. 11, two sensor elements 155 can be assembled together being parallel to one another on opposite sides of an electrical insulating layer 156. This arrangement produces the requisite number of intersecting elements on the "X" and "Y" axes which extend over the major portion of the diameter of a circle to provide the resistance elements for the circuit of FIG. 8. The structure shown in FIG. 11 will operate in the same manner described earlier. No measurable signal will be produced under no flow conditions. When flow occurs in the form of relative displacement of the fluid in which the sensor is submerged, the centroid of the thermal field will move along the "X" and "Y" axes in the general case, and the distance and direction of movement can be readily determined as earlier described.

Another form that the sensor may take for two-dimensional measurement is shown in FIG. 12. A pair of spaced-apart resistance elements, 303 and 304, serve as the "Y" axis elements and another intersecting pair of spaced-apart resistance elements 157 and 159, serve as the "X" axis elements. Of course, suitably connected end taps and center taps are provided, although not shown.

FIG. 13 illustrates a somewhat simplified circuit arrangement for two-dimensional measurement and display as viewed with an oscilloscope 305. A continuous resistance element along the "X" axis is indicated by the numerals 164, 165, this resistance being center tapped at 302 and including outer terminals 300 and 301. A similar pair of resistances 161 and 162 are arranged at right angles to the resistances 164, 165 and are center tapped at 171. The outer terminals 172 and 173 are connected to the outer terminals 300 and 301 by conductors 174 and 175, respectively. The conductor 175 is connected to one horizontal deflection plate 176 of the oscilloscope 305 by a conductor 177, and to a vertical deflection plate 179 by a conductor 180. The center tap 302 is connected to the other horizontal deflection plate 181 by a conductor 182 and center tap 171 is connected by a conductor 183 to the other vertical deflection plate 184. Ordinarily, means for providing zeroing bias potential and a variable potentiometer for adjustment are desirable. Although this circuit is somewhat simpler than that of FIG. 8, it may not be suitable for use where there is a gradient in the ambient temperature which could be critical to the measurement being made.

FIGURES 14 and 15 illustrate diagrammatically one form of spherical probe or sensor which may be used to determine the velocity of flow in any direction from the origin which can be considered to be at the center of the sphere. The structure is symmetrical about the origin and can be considered to comprise an upper hemisphere, which is indicated in general by the numeral 185, and a lower hemisphere 186. The upper hemisphere 185 is shown in greater detail in FIG. 15.

The upper hemisphere 185 is electrically insulated from the lower hemisphere, and as viewed from above as in FIG. 15, somewhat simulates a cloverleaf. A pair of sector-shaped areas 187 and 189 are connected by a connecting element 190. A similar pair of sector shaped areas 191 and 192 are connected along the same connecting area 190. The sectors 187 and 189, which can be considered as the "X" axis sensors, include opposite end terminals 193 and 194 and a center tap 195. A similar pair of sector-shaped areas 191 and 192 are provided along the "Y" axis of the sphere, and are connected by the connecting area 190 and include end taps 196 and 197 and center tap 195. Correspondingly, similar areas are provided on the lower hemisphere 186 and the arrangement is such that the resistance between the terminals 193 and 194 is the same as the resistance between similar terminals in the lower hemisphere 186 which forms the second resistance along the "X" axis of operation. In a similar manner, the sector-shaped areas 191 and 192, end terminals 196 and 197 and center tap 195 have their counterparts in the lower hemisphere which provides the second "Y" axis resistance.

Opposite facing strips 205 and 206 are located between the "X" axis and "Y" axis sector-shaped areas previously described and are arranged on opposite sides of the sphere extending substantially from one pole of the sphere to the opposite pole. As is indicated in FIGS. 14 and 15, the conductive resistance strips 205 and 206 are provided with end terminals 207 and 209, and each of the strips includes a center tap 210.

As can be visualized, the sector-shaped areas 187 and 189 correspond to the resistance elements 80 and 81 of FIG. 9, and end terminals 193 and 194 correspond to terminals 90 and 87 and the center tap 198 corresponds to the center tap 82. The lower hemisphere 186 provides similar areas on the "X" axis which correspond to resistance elements 83 and 84 with their end taps and the center tap.

The sectors of electrically resistive material 191 and 192 similarly correspond to the "Y" axis resistance elements 91 and 92 of FIG. 9 with appropriate end taps and center tap. The lower hemisphere 186 includes similarly shaped areas which correspond to the other "Y" axis resistance elements 95 and 96 of FIG. 7 with corresponding end taps and center tap.

In a similar vein, the elongated strip 205 of electrically resistive material corresponds to the "Z" axis resistance element 99 and 100 with suitable end taps and center tap. The strip 206 on the opposite side of the sphere from the strip 205 is similarly arranged, and corresponds generally to the other "Z" axis resistance elements 102 and 103 of FIG. 7 and likewise has the appropriate end and center taps as described earlier.

The method by which fluid flow can be measured using a sensor element of the nature illustrated in FIG. 14 and connected in circuit such as illustrated in FIG. 9 will now be described. The end terminals of the various resistance elements are suitably interconnected electrically in the manner shown and an appropriate electrical power source is attached across the various center taps and the deflection plates of the three different oscilloscopes are connected to appropriate terminals in the respective "X," "Y" and "Z" axis resistance elements. The sensor is immersed in the body of fluid. With the fluid at rest the power source 108 is energized so that equal current flows through the various parallel circuit branches since all sections of the various resistance elements are of equal value. The display on the screens of the three oscilloscopes, which is generally in dot form, then shows the location of the centroid of the energy field with respect to the various axes. The energy field results from the heat generated by the electrical current passing through the various resistance elements and for the present case can be considered as transmitted uniformly from the spherical sensor. This, in effect, locates the centroid of the energy field at the same point as the origin of the field and would then show up in the display oscilloscopes as the dot appearing in the middle of the oscilloscope screens. Variations in the ambient temperature around the sensor are of no concern because of the balancing effect brought about by using balanced sets of resistance elements. Even should the field not be uniform about the origin so that initially the centroid is displaced from the point of origin, there is no concern because this method is concerned with the change in location of the centroid between the no-flow and flow condition of the fluid.

When the fluid begins to flow, or alternatively when the spherical sensor is moved along in the body of fluid, the thermal energy in the field is deformed from its initial shape because of the cooling effect of the moving fluid carrying away some of the heat being transmitted outwardly from the resistance elements. This cooling effect is then reflected back into the resistance values of the resistance elements causing an unbalance in the current flow from the power source so that a potential difference of an unbalanced nature appears across the appropriate oscilloscope deflection plates which represents a shift of the thermal energy field centroid with respect to the various axes. For example, if we assume that the fluid flow is along a single axis, such as the "Y" axis, so that the centroid would be shifted by the deformation of the energy field along this "Y" axis, the direction and amount of shift of the centroid can be measured. In the circuit shown, if we assume that the fluid flow is in a direction such that the temperature is lowered in the area of resistance elements 91 and 95 and correspondingly increased in the area of resistance elements 92 and 96 there will be an unbalance which will be reflected by a potential difference between the rightmost end terminals of the resistance elements which is then transferred to deflection plates 132 and 133 to cause the indicating spot to move right or left a certain amount corresponding to the magnitude of the potential difference. The latter is an accurate reflection of the direction and degree of displacement of the centroid from its original location brought about by the flow of fluid through the energy field.

In the embodiment of the invention described heretofore which utilizes thermal energy field it has been brought out how the same sensor elements are used to produce the field as well as detecting the change in the field which occurs from the flow. In some instances it may be necessary to supplement the power source where the single power source alone is insufficient to produce adequate reading in an indicating meter or oscilloscope. FIGURE 16 diagrammatically illustrates a somewhat modified form of the circuit of FIG. 7 for this purpose. The usual center tapped resistance elements with their end taps cross connected are provided with the power source 233 connected across end taps 229 and 231 and the indicating meter 234 connected across center taps 222 and 225. The major modification comprises a second power source 237 connected by conductors 239 and 240 to the resistances 220 and 221 at points which are equally spaced from the center tap 222. In a similar manner, a third power source 241 may be connected by conductors 242 and 243 to resistances 223 and 224 at points which are equally spaced from the center tap 225. The purpose of the supplementary power sources 237 and 241 is to create an intensified heat energy field at the center points of the two parallel resistance elements.

A more elaborate system utilizing an embodiment of this invention is shown in block diagram form in FIG. 17. Modulator 265 feeds power amplifier 266 which serves as the source of power for sensor unit 267 which may be of the nature earlier described. The calibration and element measurement meter circuitry 268 is provided for periodically calibrating the resistance elements in the sensor unit 267 to make sure that they are in a balanced condition under normal test circumstances. The output of the sensor unit 267 is fed to a "Y" axis preamplifier 269 to raise the signal level to a suitable amplitude which may be necessary in some of the contemplated uses. The output of the preamplifier 269 is fed into a demodulator 270 where it is combined with a signal from the modulator 265 to produce an output demodulated signal which is fed into the linearizing amplifier 271. The latter, in turn, is fed into the scaler display of an oscilloscope 272 and may correspondingly be recorded on a single channel recorder 273. It is clear that the more elaborate system illustrated in FIG. 17 can be applied to multidimensional measuring system which would merely require additional similar units for each of the respective axes and a multichannel recorder.

It bears repeating that although thermal energy may be preferable, various other types of energy may be used to create the field. The choice of energy is governed by consideration of the dimensions of the area of interest, ease of production and sensing, geometry required and other considerations. For example, sonic energy may be used. A sonic field is created about what may be considered a point source and the distortion of the energy field produced by fluid flow can be determined and projected to appropriate axes as described earlier. Typically, barium titanate transducers may be used as generators and sensors and the amplitude of vibration is proportional to the square root energy content. Similarly, a magnetic field may be used although care must be taken to generate a uniform magnetic field and to sense distortion of the field caused by fluid flow alone. Thermal energy can be considered to be somewhat of the lowest form of energy because all energy tends ultimately to turn into heat and generation and sensing of thermal energy fields has been found to be practical and accurate. For these reasons, a thermal energy field is often preferred. It should be pointed out that measurements from separate sensors made in the manner described can be combined to provide differential flow information.

I claim:

1. Apparatus for measuring fluid flow, comprising, in combination:
   (a) a pair of tapped electrical elements having a degree of elongation arranged physically paralleling each other immersed in the fluid with one leg of each element being at least in part downstream of the other leg, said elements being characterized by producing an energy field having its center within the fluid when energized by a power source;
   (b) a source of electrical power;
   (c) means for connecting said power source across the taps of said elements to produce an energy field;
   (d) conducting means connecting an end of each element to an opposite end of the other element; and
   (e) means for measuring and displaying the degree and direction of fluid flow, said means being connected between ends of the two elements which are not connected together.

2. The invention as described in claim 1 wherein said elements are constructed in split tubular form with fluid flowing along the axis of the tube.

3. The invention as in claim 2 wherein the tube is split lengthwise to form two separated opposite facing sections.

4. The invention as in claim 3 wherein the split tubular elements are constructed to confine the fluid flow between said opposite facing sections whereby each section has a single interface with the fluid.

5. The invention as described in claim 1 wherein said elements are constructed in thin, flat form with the fluid flowing over the surface.

6. The invention as described in claim 1 wherein said elements are constructed from a pair of coextensive, thin, flat, parallel members physically separated from one another with each member being within the energy field of the other member.

References Cited

UNITED STATES PATENTS

| | | | |
|---|---|---|---|
| 1,902,427 | 3/1933 | Sawyer | 73—204 |
| 2,870,305 | 1/1959 | Ling | 73—204 X |
| 2,896,452 | 7/1959 | Cogniat et al. | 73—204 |
| 3,138,025 | 6/1964 | Fingerson | 73—204 X |
| 3,147,618 | 9/1964 | Benson | 73—204 |
| 3,161,047 | 12/1964 | Griswold | 73—189 |
| 3,255,629 | 6/1966 | Brunton. | |
| 3,352,154 | 11/1967 | Djorup | 73—204 X |

FOREIGN PATENTS

| | | |
|---|---|---|
| 743,788 | 1/1944 | Germany. |

RICHARD C. QUEISSER, Primary Examiner

E. J. KOCH, Assistant Examiner